United States Patent [19]

Seto et al.

[11] 3,896,245
[45] July 22, 1975

[54] PRESSURE SENSITIVE ADHESIVE STRIPS AND SHEETS

[75] Inventors: Kenneth Hon Seto; James Thomas Thompson, both of Dayton, Ohio

[73] Assignee: Protective Treatments, Inc., Dayton, Ohio

[22] Filed: Apr. 4, 1973

[21] Appl. No.: 347,823

[52] U.S. Cl. ............... 428/7; 428/231; 428/297; 428/352; 428/394; 428/397; 428/401; 428/521
[51] Int. Cl.[2]...B32B 25/02; B32B 25/14; B32B 27/20
[58] Field of Search ....... 161/76, 77, 175, 177, 180, 161/181, 165, 167, 406, 145, 254, 242, 243

[56] References Cited
UNITED STATES PATENTS

| | | | |
|---|---|---|---|
| 2,292,024 | 8/1942 | Dreher | 161/167 X |
| 2,633,440 | 3/1953 | Scholl | 161/76 X |
| 2,653,885 | 9/1953 | Harper | 161/167 X |
| 3,423,276 | 1/1969 | Eckenroth | 161/413 X |
| 3,455,077 | 7/1969 | Long | 161/76 X |
| 3,503,568 | 3/1970 | Galley | 161/167 X |
| 3,515,625 | 6/1970 | Sedlak et al. | 161/77 X |
| 3,581,884 | 6/1971 | Caldwell | 161/167 X |
| 3,634,299 | 1/1972 | Shim et al. | 161/165 X |
| 3,687,794 | 8/1972 | Shanok et al. | 161/5 |
| 3,729,205 | 4/1973 | Kwok | 161/175 X |

Primary Examiner—Harold Ansher
Attorney, Agent, or Firm—Dressler, Goldsmith, Clement & Gordon, Ltd.

[57] ABSTRACT

Composite pressure sensitive adhesive sheets and strips for attaching two members together comprise an elongatable, permanently compressible, cohesive base strand or sheet having little or substantially no resilience and exhibiting low flow and carrying on one or both sides a pressure sensitive adhesive material adapting it for particular applications. Plastic trim strips laminated to exterior automobile bodies by such coated strips show tenacious adhesion and good resistance to creep and to delamination under impact at low and high temperatures.

6 Claims, 3 Drawing Figures

PATENTED JUL 22 1975  3,896,245
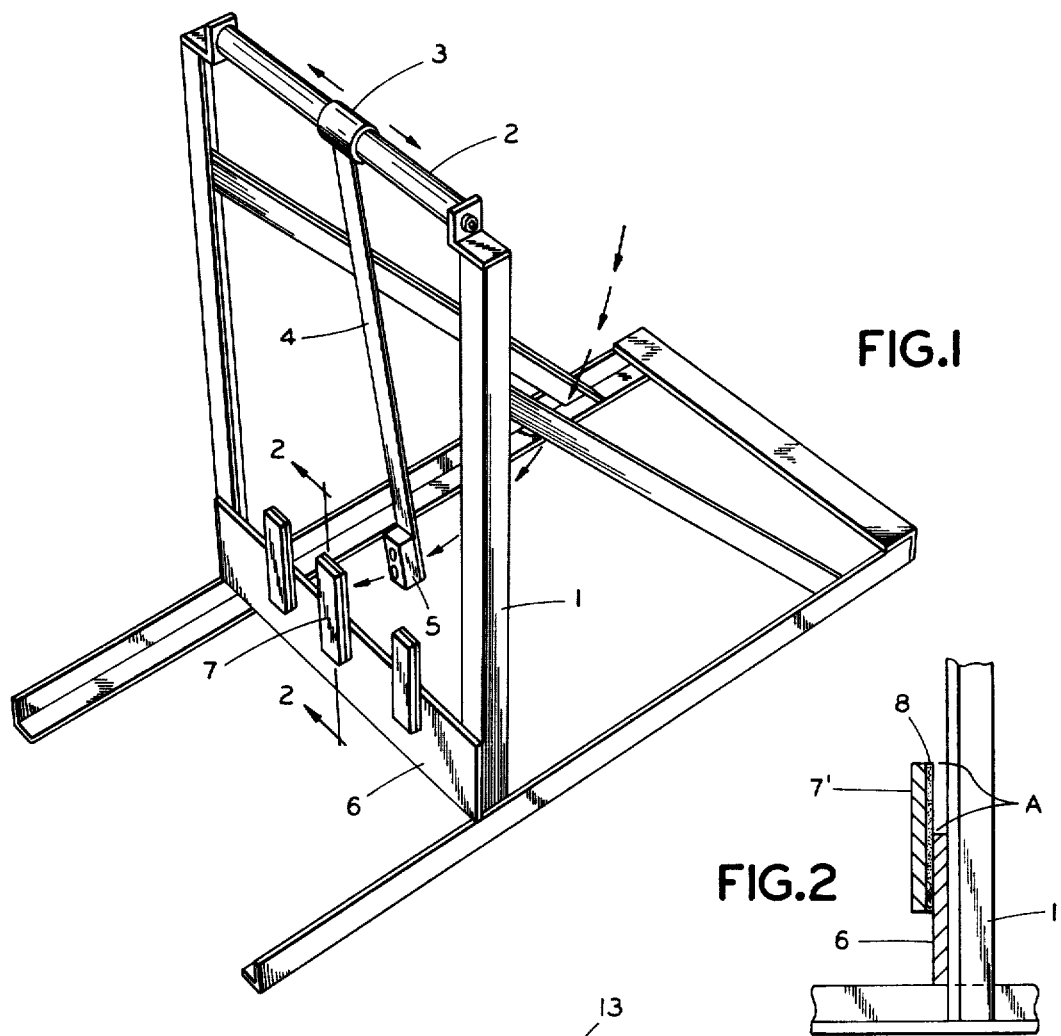
FIG.1
FIG.2
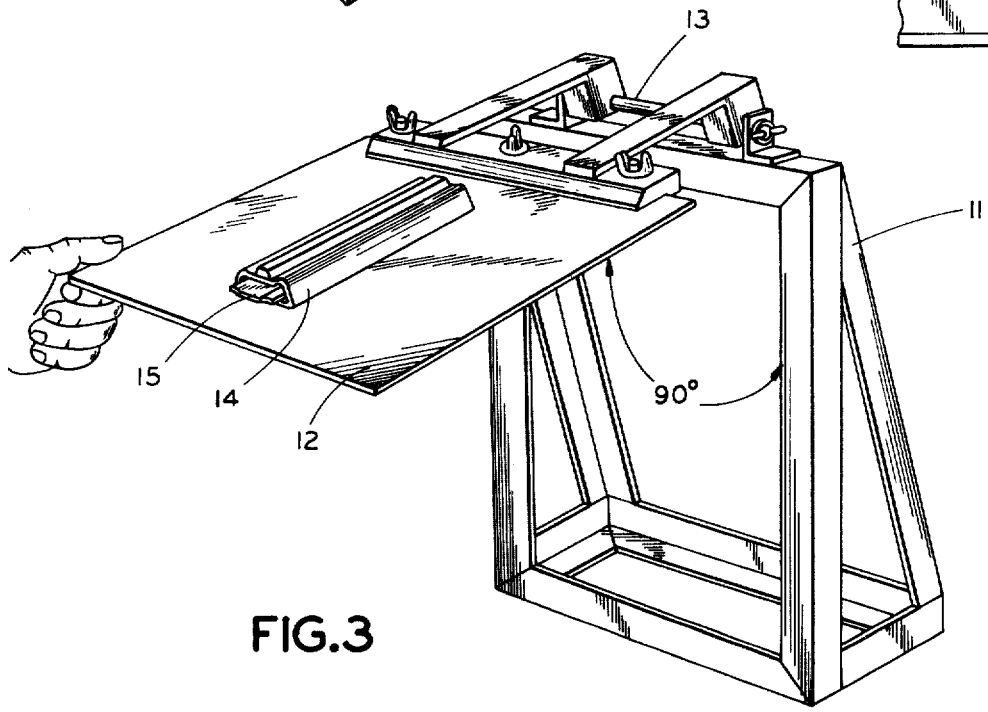
FIG.3

PRESSURE SENSITIVE ADHESIVE STRIPS AND SHEETS

BRIEF SUMMARY OF INVENTION

This invention relates in general to a pressure sensitive adhesive strand or sheet for attaching two members together and in particular, to an ornamental molding carrying such a pressure sensitive adhesive strand or ribbon, adapting it for attachment to an automobile body.

It has been proposed to provide ornamental trim strips made of plastic material for exterior decoration of automobile bodies and to attach such trim strips to automobile body by means of an adhesive composition. However, the adhesives proposed for attaching such strips to the automobile body have certain limitations. Among the conditions which have to be considered in attaching trim strips to the automobile body are: the effect of water exposure on the adhesive in warm and in cold weather; exposure to high temperatures in summer and below freezing temperatures in winter; the toleration of surface contamination (such as dust, etc.) in attaching the trim strip to the body surface; resistance to peeling by acts of vandalism, and resistance to dislodgment by impact, as when a door carrying such trim strip is slammed closed, especially in below freezing temperatures. It is also desirable that if a trim strip is accidentally dislodged, it should be capable of reattachment by the original adhesive.

It has been proposed to attach such trim strips to automobile bodies by the interposition of a base strand or ribbon of cured elastic polyprene sponge or other cured elastic sponge material coated on both surfaces with a thin layer of pressure sensitive adhesive. Such strip superficially appears to adhere well to the body, but once removal is started, by pulling away its end, it can be removed relatively easily with separation at the adhesive interface. After being pulled away in this manner, or otherwise accidentally removed or pulled away, generally it cannot be satisfactorily reattached. Also, after exposure to water followed by freezing, such strips are deficient in low temperature adherence under impact.

The present invention consists of a composite structure comprising a substantially non porous base strand or sheet of compounded plasticized elastomeric material having little or no resilience, and capable of being permanently deformed by pressure above about fifteen pounds per square inch but exhibiting little or no flow at 0.6 pounds per square inch, or less, said base strand or sheet having a pressure sensitive material of unlike character diffused into or coated on one or more of its contacting surfaces, to enhance the adhesiveness of the composite structure to various surfaces. Tensile strength of the base strand measured as a ribbon about 0.03 to 0.08 inch thick is at least 20 pounds per square inch at break. Such a composite coated strand or ribbon may be employed for attaching a trim strip to an automobile body. Such a composite strand can be applied to a waxed surface, and conforms to irregular body surfaces. It shows outstanding resistance to peeling and to the impact cleavage test hereinafter described.

The properties of the base strand are conveniently measured in the form of a rectangular strand about 0.4 inch on a side, and the properties of the base strand described herein refer to a strand of such form and thickness unless otherwise indicated. In such form the base strand, for example, is permanently deformable to half thickness by a force in the range 45 to 250 pounds per square inch, and after such deformation exhibits little or no spring back or resiliency. Thus, rebound under load one hour after such compression is in the range 0 to 7½ percent of original thickness, and thereafter, loaded by a weight of 1½ pounds over a 6 inch length of strand for 24 hours at 190°F. flow of the strand is 0 to 0.02 inch measured by decrease in height. Preferably the base strand has a rebound 1 hour after compression of 0 to 0.15 inch, more preferably 0 to 0.001 inch, and thereafter loaded by 1½ pounds over a 6 inch length for 24 hours at 190°F., has 0 to 0.001 inch flow, measured by decrease in height.

A preferred base strand composition comprises an intimate tacky mixture of elastomeric polymer or copolymer material, which may be in an uncured state or in less than a fully cured state, or may contain a mixture of uncured and partially cured elastomeric polymers, a low-volatile liquid plasticizer, and finely divided solids which are fibrous or which form thixotropic mixtures with the liquid plasticizer. In addition, the composition may contain other types of finely divided solids, for improving tensile strength and extrudability of the composition or as an extender, tack increasing ingredients, mixing aids, antioxidants, and other desirable ingredients. The strand compositions described in the United States patent applications of Donald R. Strack, Ser. No. 101,084 filed Dec. 23, 1970 and Kenneth Hon Seto, Ser. No. 253,473 filed May 15, 1972 (now abandoned), for example, may be employed as base strands herein, and the disclosures thereof are incorporated herein by reference.

The composite strand may be mounted on a suitable low adherence peelable backing for general use, or it may be attached to a relatively rigid trim strip, for example, a polyvinyl chloride strip, with the non-attached surface protected by a low adherence backing strip. The strand exhibits good adherence to te polyvinyl chloride strip as well as to the automobile surface.

The invention, as it applies to a composite strand consisting of a base strand coated on one or both sides with a pressure sensitive adhesive layer, is not restricted with respect to the nature of the pressure sensitive adhesive coating. Normally tacky pressure sensitive adhesives of the rubber-resin type are known in the art and may be employed as the adhesive coating on a backing material in the form of a pliable sheet or tape to form the composite strand. Typical formulae of such pressure sensitive adhesives contain elastomeric polymers or co-polymers, synthetic rubber, and rosin or various hydrocarbon resins, polyterpene resins, coumarone-idene resins, and other suitable tackifying resins. These adhesives adhere to most surfaces on mere touch contact therewith. Some pressure sensitive adhesives will be preferred as coating materials for particular applications, depending on the surface to which the composite strand is to be attached. For example, coatings of acrylic based pressure sensitive adhesives are preferred for attachment of the composite strand to polyvinyl chloride trim strips and to acrylate finish enameled or lacquered automobile bodies.

Examples of suitable acrylic based tacky pressure sensitive adhesive materials for coating the strands or ribbons described herein are those described in U.S. Pat. No. Re. 24,906, including polymers of non-tertiary alcohol esters of acrylic acid with 3 to 12% of acrylic acid, methacrylic acid, acrylamide, methacrylamide, itaconic acid or acrylonitrile, or mixtures of such monomers. Examples of such esters of acrylic acid are those of n-butanol, 2-methyl butanol, 1-methyl butanol, 2-ethyl butanol, n-pentanol, isopentanol, 1-methyl pentanol, 2-methyl pentanol, 3-methyl pentanol, 3, 5, 5-trimethyl hexanol, heptanol-3, isooctanol, n-decanol, dodecanol and higher homologues. Examples of such pressure sensitive adhesive coating materials include copolymers of 285 parts isoamylacrylate with 15 parts acrylic acid in 700 parts ethyl acetate and 800 parts heptane; of 95.5 parts isooctyl acrylate with 4.5 parts acrylic acid in 80 parts heptane and 20 parts propyl alcohol; of 96 parts isooctyacrylate with 4 parts acrylamide in a mixture of ethyl acetate and heptane. Other suitable acrylic based pressure sensitive coating materials are those described in U.S. Pat. No. 2,544,692, which include copolymers of about 75 to 95 parts by weight of an acrylate ester of a saturated non-tertiary monohydric alcohol having 4 to 6 carbon atoms with 25 to 5 parts of a fumarate diester of a like or unlike saturated non-tertiary monohydric alcohol having 4 to 6 carbon atoms. Acrylic polymer adhesives are commercially available under trade names, for example "Hycar" 2100X20, which is a self-curing polymer of ethylhexyl butyl acrylate and higher alkyl groups in a mixture of toluene and methylethyl ketone; "Permagrip" 010-36; and Permagrip D14-12A. Other suitable commercially available adhesives are "Neoprene" adhesive G-1195 and Dow Corning silicone resin 282. Neoprene and Permagrip are trade marks.

We do not fully understand the mechanism which results in the superior performance of the coated base strands of this invention compared to a cured resilient sponge elastomer base strand similarly coated, but believe it involves a number of factors. The generally low resilient nature of the base strand and its deformability under pressure enables it to conform permanently to surface irregularities on the automobile body when the strand is pressed against a body surface and thus the strand presses the surface coating against such body surface without producing tension strains in the coating when the pressure is released. The superior performance is most pronounced in the impact cleavage test described hereinafter. Because of the plastic nature of the base strand, an applied separating force is distributed over a relatively large area which results in a small unit area force, so that failure occurs in cohesion and not at the interface.

Among the synthetic elastomeric materials which are suitable and may be selected for use alone or in mixtures for forming the base strand are the commercial butyl rubbers; halogenated butyl rubbers; cross linked butyl rubbers; polyisobutylene rubbers; ethylene-propylene rubbers, for example, "Enjay" EPT 3509; chlorosulphonated polyethylene; thermoplastic block polymers of butadiene-styrene rubbers; polyisoprenes; thermoplastic rubbers, and the like. The elastomers are employed preferably in dry form as distinguished from latices.

The preferred elastomers are the uncured polybutylene based elastomers, as these have desirable properties such as resistance to aging, weathering, ozone and radiation, and retain elasticity over a wide temperature range. Examples of suitable polybutylene based elastomers are halogenated butyl rubbers as described in U.S. Pat. No. 2,944,578, commercial examples of which are Enjay Butyl HT 10-66 and HT 10-67; butyl rubbers described in Taylor U.S. Pat. No. 2,356,128, which are copolymers of about 70 to 99.5% weight of isoolefins and about 30 to 0.5% of a diolefin, (commercial examples of which are Enjay butyl 365, Polysar butyl 402, Enjay butyl 218, and "Polysar" 301; cross linked butyl rubbers such as copolymers of polyisobutylene with up to about 5% of a divinyl aromatic compound, and a small amount of a diolefin, as exemplified by British Pat. Nos. 642,050 and 682,771 (a commercial example of which is Polysar butyl XPRDA 925, now known as PB 3301 and polyisobutylene rubbers of viscosity average molecular weight above about 62,000, commercial examples being "Vistanex" MML80, MML120 and MML180. Enjay, Polysar and Vistanex are trademarks.

Enjay Butyl HT 10-66 has an average viscosity molecular weight about 350,000 to 400,000, a Mooney viscosity of 50 to 70, has about 1 to 2% unsaturation, and is a copolymer of 98 to 98.5% isobutylene with 1.5 to 2% isoprene, which copolymer has been chlorinated to 1.1 to 1.3% chlorine content. Polysar butyl 3301 is a copolymer of about 98 to 98.5% isobutylene with 1.5 to 2% isoprene, and about 0.5% divinylbenzene, and has a Mooney viscosity about 70. It is also called herein cross linked butyl rubber. Polysar 301 is a copolymer of about 98 to 98.5% isobutylene and 1.5 to 2% isoprene, has about 1.6 mol percent unsaturation and a Mooney viscosity about 60.

It is generally desirable to use two or more elastomeric materials in compounding the base strand composition so as to provide a broader range of useful properties. The presence of thermoplastic rubbers in the proportion of 5 to 15% of the elastomeric content is desirable and improves the low temperature properties. A suitable commercial example of thermoplastic rubber is butadiene-styrene block polymer commercially known as "Kraton" 1002. Kraton is a trademark. Rubbers which do not extend well with oil, such as butadiene-acrylonitrile polymers, are used only in minor amounts with other elastomers. In using partially cured or cross linked elastomer, the cure should not be carried out to the extent where the elastomer cannot be mixed with the other ingredients or where the mixture cannot be extruded satisfactorily into strand form. Solubility in cyclohexane is a measure of the absence of cure or degree of uncure. The terms cure and cross linking are generally used synonomously in the art.

The low volatile plasticizers do not volatilize to any significant extent over the life of the compositions, and are regarded as permanent plasticizers. The plasticizers may also have tackifying properties. They should be compatible with the elastomers present, and may be selected from the relatively large groups commercially available, including processing oils, liquid polyolefins, ester plasticizers, chlorinated polyhydrocarbons, low melting resins and broken down rubbers. The amount of plasticizer required to produce the desired properties varies with the particular elastomers employed, the plasticizer selected and the amount of finely divided fibrous solids present. In general for making preformed base strands the total amount by weight of the low-volatile plasticizer or mixture of low-volatile plasticizers in the composition should be from about 0.45 to 2.5 times the weight of elastomeric material in the composition, a preferred range being 0.75 to 1.5, and a more preferred range being about 0.6 to 0.74 times the weight of the elastomeric material. Examples of suitable naphthenic, paraffinic and aromatic processing oils by trademark names are "Necton" 60, "Famax" 58, "Coray" 80, "Sun" Oil 2280, "Circo Light," and "Sundex" 53. Also suitable are viscous liquids generally regarded as plasticizers in the elastomer art, such as polychlorinated polyphenyls known under the trademark names "Aroclor" 1254 and Aroclor 1263 and the ester plasticizers for example, dioctyl phthalate, dioctyl sebacate, butyl oleate, and liquid wood rosins. The liquid grades of polyolefins, especially polymers of the $C_3$ and $C_4$ olefins, such as, for example, polybutenes, polyisobutylenes, and polypropylenes are suitable as low-volatile plasticizers.

The finely divided solids which are an ingredient of the compositions should be selected to exhibit resistance to deterioration by weathering, aging, rot, radiation and other conditions encountered in service and limit cold flow to the required extent. For resisting and limiting cold flow under pressure finely divided solids which are either in fibrous form, or which produce thixotropic mixtures with the plasticizers should be present. The fiber lengths of fibrous solids should be quite short so that the fibers do not "ball up" in the mixing operation. "Balling up" of the fibers produces a non-uniform composition lacking in strength and smoothness of surface.

Examples of suitable finely divided bulk fibrous solids which may be used include fibrous mineral solids, such as asbestos, fibrous talc, wollastonite and bulk glass fibers, synthetic materials such as nylon fibers and the like. Examples of thixotrope forming solids include "Bentone" 34 and very finely divided colloidal or submicroscopic size chain type carbon blacks and silica particles. Commercially available examples of such materials are: of asbestos, "Carey" 7RF10; of fibrous talc, "International" Fiber No. 1; of wollastonite, "International" wollastonite Pl; of chain type silica, "Cab-O-Sil"; of chain type carbon blacks, "Statex" M70. Bentone 34 is believed to be dimethyldioctodecyl ammonium bentonite. (Bentone, Carey, International, Cab-O-Sil and Statex are trademarks).

Among the available finely divided fibrous mineral solids, bulk asbestos is outstanding in its ability to limit cold flow and retain large amounts of viscous liquid, and is the finely divided fibrous material of choice. Bulk asbestos fiber is commercially available in various degrees of fiber length or fineness and in various types, and generally is graded for fiber length by the Quebec screen test of the Quebec Asbestos Producers Association (abbreviated Q.A.P.A.). In general the fiber length corresponding to the No. 7 milled grades asbestos is satisfactory, and the R type is preferred. The milled grades numerically above 7 and alphabetically above R, (which are finer and have shorter fiber lengths) can be employed. Fibers of other materials which correspond in fineness to the grades of asbestos above stated are suitable. Longer fibers tend to ball and do not mix uniformly into the compositions. In general, there is employed a ratio range of from about 0.5 to 2½ parts by weight finely divided bulk fibrous solids or solids that form thixotropic mixtures to one part elastomeric material in making preformed tapes, a preferred range being from about 0.8 to 1½ parts, and a more preferred range being 0.8 to 1.2 parts.

The compositions may contain other finely divided solids which serve as extenders or impart desirable functions. Carbon black is a desirable ingredient in some of the compositions where it improves the cohesiveness or tensile strength of the composition and imparts other desirable properties. The presence of finely divided fibrous solids results in a rough surface when the composition is extruded as a strand or rope, or is rolled into a sheet, although the finer grades of fibrous solids result in smoother surfaces. The smoothness upon extrusion or rolling is improved by the presence, in addition to fibrous solids, of carbon black, hydrated silica and/or talc. Chain type carbon black particles are preferred because of their thixotropic action with the plasticizers. A commercial example of carbon black in oil is that known under the trademark Statex M70 from Columbian Carbon Company, which contains about 100 parts by weight carbon black to 70 parts by weight oil. Such carbon black is of the chain particle type. Other finely divided solids which may be present, for example, are calcium carbonates as an extender, titanium dioxide and zinc oxide for coloring or preservative action. Calcium oxide or equivalent materials may be added to bind water, and is useful where the composition must withstand temperatures above 212°F., as for example, in testing. An example of hydrated silica is "Hi-Sil 233" from Columbia-Southern Chemical Corp.; and of platy talc is "Mistron Vapor" from Sierra Talc and Clay Co. The total amount of finely divided solids of all kinds in the composition should be at least 93 parts per part elastomeric material by weight and preferably is 1.50 to 3.00 times the elastomeric material.

A number of substances are known in the art as ingredients of elastomer tapes to produce tackiness, and these may be included for such purpose. Examples of suitable tackifiers are chlorinated biphenyls illustrated by Aroclor 1254 and Aroclor 1260, nonreactive polymethylol phenol resin (Commercially available under the names "Amberol" ST 137X, "Catalin" 8318, and "SP 1047" of Schenectady Varnish Co.), rosins, hydrogenated rosins, and esterified rosins (exemplified by the commercial products "Pentalyn H,""Staybelite" resin, Staybelite ester 3), and ethylenglycol monobutyl ether pelargonate (Amberol, Catalin, "BRL 2741", Staybelite and Pentalyn are trademarks.

Resistance to impact cleavage may be measured in an apparatus in which a strip of metal is attached by the adhesive strand to be tested to a plate of suitable material so that a predetermined length of the strip extends beyond the edge of the plate. This extending portion is struck by a weighted pendulum on its down stroke moving in the direction to separate the strip from the plate.

The invention is described in greater detail in the following illustrative examples and in connection with the accompanying drawing wherein:

FIG. 1 is a diagramtic view of an impact cleavage testing apparatus;

FIG. 2 illustrates the mounting of sample strips for testing, and

FIG. 3 is a partly diagramatic view of a slam test apparatus.

Referring to the drawing, FIG. 1, the mounting frame 1 of the apparatus supports a rod 2 of low friction material, such as "Teflon," on which a sleeve 3 of metal is freely journalled, and a rod 4 extends from the sleeve. This rod carries a weight 5 at its end. A plate 6 has attached thereto one or more samples 7 to be tested. As shown in FIG. 2, sample 7 consists of the metal strip 7' mounted thereon by an adhesive strip 8 to be tested. The plate is rigidly held on the frame and the pendulum rod 4 is raised to the horizontal position and then released to move in the direction of the arrows so as to strike the projecting portion A of the test strip. Failure is indicated if the test sample shows any permanent displacement from the mounting plate 6. In a low temperature impact cleavage test failure generally occurs by the sample being forcibly projected off of the plate 6. The test specifications are as follows:

| | |
|---|---|
| Pendulum impact | 15 inch pounds |
| Strip dimensions | 1in.×3in.×¼in. |
| Exposed end of Strip | 1 inch |
| Pressure for attaching strip to plate | 15 p.sq.in. |

Successful test requires withstanding five or more impacts at −20°F. This test is a measure of resistance to vandalism.

The slam test apparatus shown in FIG. 3 is intended to simulate the force developed when an automobile door is slammed closed. The vertical frame 11 carries a plate 12 hinged at 13, and the plastic trim strip 14 to be tested is adhered by a strand 15 to the plate 12 with its end three inches from the bottom edge of the plate 12. The plate is raised to horizontal position and allowed to fall freely and impact the frame 11 at the bottom of its fall. In a successful test the trim strip must remain intact after five slams at −20°F. Failure generally occurs by the trim strip being projected rearwardly off the plate, apparently due to the developed rebound force.

The invention is illustrated by the following examples of base strands:

EXAMPLE I

| Ingredient | Parts by Weight |
|---|---|
| (a) Chlorinated butyl rubber | 200 |
| (b) Isobutylene-divinyl aromatic polymer | 200 |
| Hydrogenated wood rosin | 44 |
| Tall oil fatty acid | 8 |
| Carbon black (140 parts) | 82.3 |
| Oil in carbon black | 57.7 |
| Asbestos powder | 320 |
| Processing oil | 475 |
| Platy talc | 320 |
| Lime (calcium oxide) | 46 |

(a) A commercial example is "Enjay" butyl HT 10-66.
(b) A commercial example is Polysar butyl XPRDA 925. Its presence is preferred to retard exudation of oil.

The hydrogenated wood rosin increases tackiness. An example of commercial hydrogenated wood rosin is Staybelite resin, which has an acid number of about 165, a saponification number of about 167 and an ASTM ring and ball softening point of 68°C. The tall oil fatty acid acts as a wetting agent for the particulate materials. An example of commercial tall oil fatty acid is Acintol FA2 from Arizona Chemical Co. This serves as a wetting agent for the finely divided solids and aids in mixing. A commercial example of processing oil is Sun Oil 2280. Commercial examples of asbestos powder, hydrated silica powder and platy talc are respectively: 7RF10 from Philip Carey Mfg. Company, Hi-Sil 233 from Columbia-Southern Chemical Corp., and Mistron vapor from Sierra Talc and Clay Co. The lime binds any water present and is useful where the composition must withstand temperatures above 212°F., as for example, in testing. Total finely divided solids is about 1.9 times the elastomeric material and the asbestos is about 0.8 times the elastomeric material.

Mixing Procedure

The elastomers are charged into a jacketed rotary arm mixer and then the hydrogenated wood rosin is added and mixed in to a homogeneous mass, the mixing being carried out at about 160°F. Then the carbon black is added and mixed in to a smooth consistency. Then the asbestos and about one-fourth of the processing oil is added and mixed in. Now the hydrated silica, another fourth of the processing oil, and the talc and lime are mixed in. The balance of the processing oil now is mixed in and the mixture is cooled and discharged from the mixer. The composition is extruded through a die to form a tape which is mounted on a pliable release backing, for example, a silicone coated kraft release paper. The mounted tape is then heat treated in an oven at about 175°F. for 24 hours to relieve internal strains. Alternatively, if desired, the heat treatment may be at 210°F. for 80 minutes. The heat treatment reduces cold flow and increases rebound.

EXAMPLE II

In the above example, I use 400 parts of butyl rubber, for example, Polysar butyl 301, in place of the elastomers of Example I, and increase the asbestos powder to 400 parts, and increase processing oil to 515 parts.

When extruded into a rectangular base strand 0.4 inch on a side, it required a force of 110 pounds to compress a 6 inch length to half thickness. This calculates to 45.8 pounds per square inch. Rebound height after 1 hour is 0.230 inch, and rebound is 7.5 percent of original thickness. Yield strength is 8 pounds per square inch and Shore A hardness is 12.

EXAMPLE III

In above Example I, I replace half the isobutylene-divinyl aromatic polymer by butyl rubber, and increase the asbestos powder to 400 parts, and the processing oil to 515 parts.

EXAMPLE IV

In Example III, I replace the asbestos by an equal weight of chain type silica for example Cab-O-Sil.

EXAMPLE V

In Example III, I replace the asbestos by an equal weight of Bentone 34.

Properties

| | Ex. III | Ex. IV | Ex. V |
|---|---|---|---|
| initial thickness (inch) | .4 | .4 | .4 |
| rebound thickness at 1 hour (inch) | .227 | .214 | .210 |
| flow at 24 hours at 190°F. (inch) | .003 | .000 | .001 |
| residual height at 24 hours (inch) | .224 | .214 | .209 |
| compressive load (pounds) | 110 | 110 | 100 |
| yield strength (P.S.I.) | 8 | 11 | 15 |
| Shore A hardness | 13 | 16 | 18 |

EXAMPLE VI

| Ingredient | Part by Weight |
|---|---|
| Butyl rubber PB 402 | 50 |
| Butyl rubber PVB 3301 | 38 |
| (c) Thermoplastic rubber | 12 |
| Oronite 20 polybutene | 25 |
| Sun oil 2280 | 25 |

EXAMPLE VI—Continued

|  | Ex. III | Ex. IV | Ex. V |
|---|---|---|---|
| Processing oil (in carbon black) |  |  | 19.37 |
| Carbon black (chain type with oil) |  |  | 27.68 |
| Asbestos 7RF 10 grade |  |  | 80 |
| Platy talc |  |  | 62 |
| Hydrated silica |  |  | 11 |
| Mixing aid |  |  | 1.5 |
| Amberol ST 137X |  |  | 8 |

(c) An example of thermoplastic rubber is a styrene-butadiene block polymer, a commercial example being "Kraton" 1002.

In the above example the total liquid plasticizer content is 69.37 parts and the total finely divided solids is 180.7 parts. The carbon black is a chain type structure, commercially available in admixture with the processing oil, and with the asbestos makes up 107.7 parts. The Amberol ST 137X is a tackifier. The polybutene also serves as tackifier and improves the resistance of the elastomers to deteriorating weathering influences. Sun oil 2280 is a processing oil and in admixture with the polybutene produces a plasticizer liquid of lower viscosity. If higher viscosity polybutene is used a greater amount of processing oil may be present to lower the viscosity.

The above mixture is extruded in the form of a ribbon about 0.05 inch thick and ⅝ inch wide onto a backing strip. Heat treatment of the extruded strip is omitted. The extruded strip is then coated on both sides with an acrylic polymer based pressure sensitive material in a suitable solvent, for example, a 76% solution of Hycar 2100 X 20 in toluene and methylethyl ketone.

Such coated ribbon is applied to a trim strip of polyvinyl chloride, cellulose acetate butyrate, or other suitable plastic material which may encapsulate a metallic lustre film of metal or plastic, for example as described in the application for patent of James T. Thompson Ser. No. 164,533 filed July 21, 1971.

Absence of creep is an important property of the strand. Creep may be measured in an accelerated test by attaching a strand to a polyvinyl chloride trim strip 3⅝ inch long, adhering the strip to an acrylic finished metal panel by a pressure of about 5 lbs. per square inch, and hanging a 200 gram weight vertically therefrom, the test being conducted in an air oven at 158°F. for 7 days. Movement of the top edge is the creep. Zero creep in 7 days is desirable, and creep in the range up to 0.03 inch in 7 days is acceptable, a creep under 0.015 inch in 7 days being preferred.

In a comparative impact cleavage test involving the composition of Example 1 coated with a solution of Hycar 2100 X 20 acrylic polymer, and a commerically available neoprene sponge ribbon coated with a pressure sensitive adhesive, the neoprene ribbon failed on the first or second impact cleavage test, whereas the said coated Example 1 ribbon withstood more than five impacts, and when testing was continued to failure, failure occurred in cohesion. In the low temperature slam test at −20°F., a strip of said commercial sponge neoprene adhesive which had been exposed to water failed on the first or second impact whereas the coated Example 1 ribbon similarly exposed to water and tested successfully resisted more than five impacts.

We claim:

1. A permanently compressible pressure sensitive composite strand adapted for attachment to an automobile body consisting essentially of a tacky permanently compressible, nonporous cohesive base strand having a thickness of about 0.03 to 0.08 inch, said base strand having little or no resilience and constituted by elastomeric material compounded with from 0.45 to 2.5 times the weight of elastomeric material of low volatile liquid plasticizer and finely divided solids in an amount of at least 0.93 parts per part of elastomeric material, the finely divided solids including from 0.5 to 2 ½ parts, per part of elastomeric material, of finely divided bulk fibrous solids or solids that form thixotropic mixtures with the said liquid plasticizer, said base strand being coated with a pressure sensitive adhesive, and said base strand being permanently deformable by pressure above about 15 pounds per square inch, but exhibiting negligible flow at 0.6 pounds per square inch pressure.

2. A composite strand as recited in claim 1 in which said base strand is about 0.03 to 0.05 inch thick.

3. A composite strand as recited in claim 1 in which said elastomeric material includes 5 to 15% of thermoplastic rubber, the balance being uncured polybutylene.

4. A composite strand as recited in claim 1 in which the low volatile plasticizer is present in an amount of from 0.75 to 1.5 times the weight of the elastomeric material, the finely divided solids are present in an amount of from 1.5 to 3.0 times the weight of the elastomeric material, and these solids include from 0.8 to 1½ parts per part of elastomeric material of bulk fibrous solids or solids that form thixotropic mixtures.

5. A composite trim strip comprising a strip of plastic trim material having an ornamental surface and an attaching surface, and a permanently compressible pressure sensitive composite strand having a thickness of about 0.03 to 0.08 inch, said strand being coated on both sides with a pressure sensitive adhesive having one of its pressure sensitive coated sides adhered to said attaching surface and the other of its pressure sensitive coated sides covered with a release layer, said composite strand consisting essentially of a tacky permanently compressible, nonporous cohesive base strand having little or no resilience and constituted by elastomeric material compounded with from 0.45 to 2.5 times the weight of elastomeric material of low volatile liquid plasticizer and finely divided solids in an amount of at least 0.93 parts per part of elastomeric material, the finely divided solids including from 0.5 to 2½ parts, per part of elastomeric material, of finely divided bulk fibrous solids or solids that form thixotropic mixture with the said liquid plasticizer, and said base strand being permanently deformable by pressure above about 15 pounds per square inch, but exhibiting negligible flow at 0.6 pounds per square inch pressure.

6. A composite trim strip as recited in claim 5 in which said strip of plastic is constituted by polyvinyl chloride at the surface thereof which is attached to said base strand, and said pressure sensitive adhesive is a copolymer of an acrylic acid ester containing at least 4 carbon atoms with from 3–12% of acrylic acid, methacrylic acid, acrylamide, methacrylamide, itaconic acid, or acrylonitrile, or mixtures thereof.

* * * * *

UNITED STATES PATENT OFFICE
CERTIFICATE OF CORRECTION

PATENT NO. : 3,896,245

DATED : July 22, 1975

INVENTOR(S) : Kenneth Hon Seto
James Thomas Thompson

It is certified that error appears in the above-identified patent and that said Letters Patent are hereby corrected as shown below:

Col. 2, line 40, "te" should read --the--

Col. 6, line 29, "93" should read --.93--

Signed and Sealed this thirteenth Day of April 1976

[SEAL]

Attest:

RUTH C. MASON  
*Attesting Officer*

C. MARSHALL DANN  
*Commissioner of Patents and Trademarks*